J. O. Kopas,
Washing Machine.
No. 101,277. Patented Mar. 29, 1870.
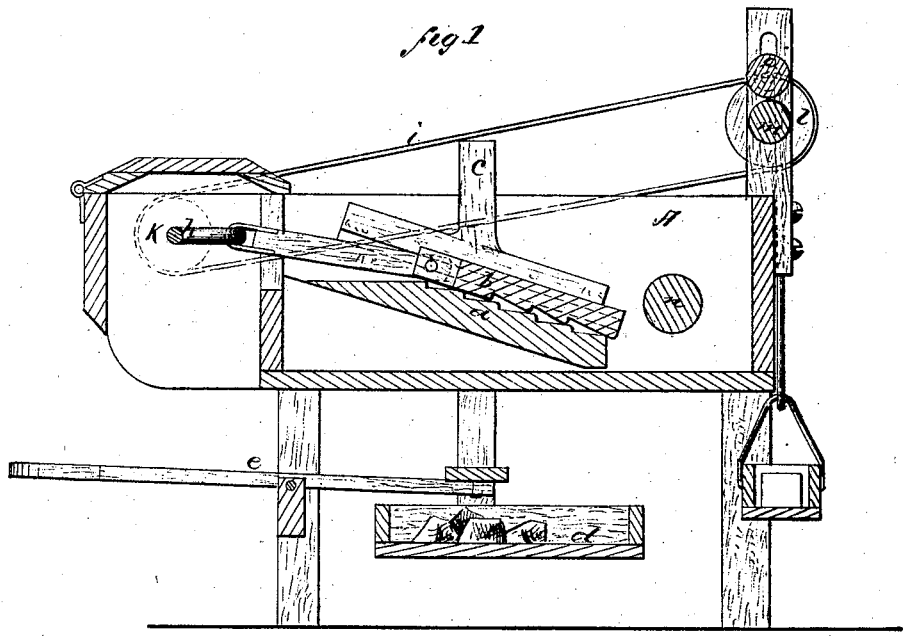
Fig. 1
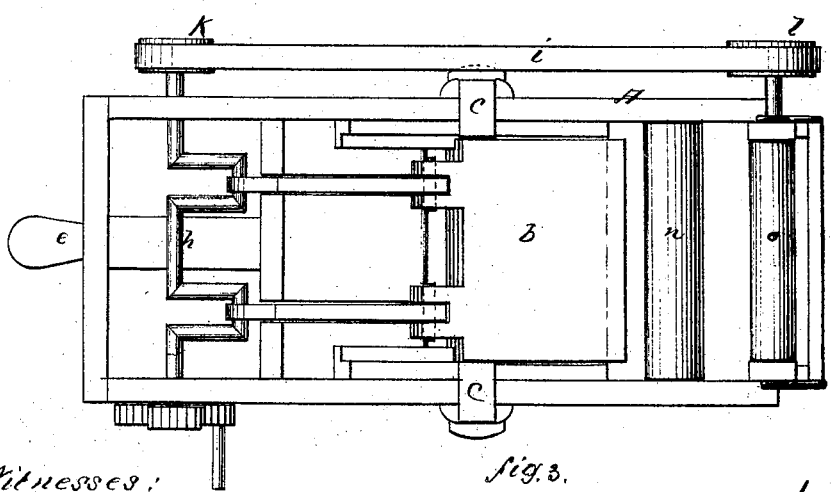
Fig. 2.
Fig. 3.
Witnesses: Inventor.

United States Patent Office.

JOHN O. KOPAS, OF WASHINGTON, DISTRICT OF COLUMBIA.

Letters Patent No. 101,277, dated March 29, 1870.

IMPROVED WASHING-MACHINE.

The Schedule referred to in these Letters Patent and making part of the same.

*To all whom it may concern:*

Be it known that I, JOHN O. KOPAS, of the city and county of Washington, in the District of Columbia, have invented a new and useful Improvement in Washing-Machines; and I do hereby declare that the following is a full, clear, and exact description of the same, reference being had to the accompanying drawings making a part of this specification, in which—

Figure 1 is a sectional elevation, and
Figure 2 is a plan view.

This invention consists in the combination of a wringer with a washing-machine, when the latter is provided with a reciprocating rubber that slides in a weighted vertical sash, by means of which the rubber is pressed downward upon the inclined wash-board, or upon the garments inserted between the rubber and wash-board, and when the wringer and rubber are operated from the same shaft.

In the drawings—

A is a washing-machine case.
*a*, the inclined wash-board.
*b*, the reciprocating rubber.
*c*, the vertical sash in which the rubber slides.
*d*, a tray appended to the lower side of the vertical sash for holding the weight, by which the latter, with the rubber, is pressed downward more or less forcibly by a lighter or heavier weight, according as coarse or fine clothes are in the wash.

*e* is a lever for raising the tray, sash, and rubber whenever occasion may require.

*h*, the crank-shaft which drives the reciprocating rubber.

*i*, a belt which connects a pulley, *k*, on the crank-shaft with a pulley, *l*, on the shaft of the lower wringing-roll *m*.

The fabrics undergoing the cleansing process pass between the rubber *b* and board *a*, under the roller *n*, and upward between the wringers *m* and *o*, the latter deriving its rotation from the same shaft, *h*, that drives the rubber, the advantages of which arrangement are that gearing is reduced, and the wringers draw the fabrics between the rubber and board.

Having thus described my invention,

What I claim as new, and desire to secure by Letters Patent, is—

The combination of the wash-board *a*, rubber *b*, weighted sash *c*, crank-shaft *h*, and pulley *k* with the belt *i*, wringers *m o*, and pulley *l*, all as and for the purpose set forth.

J. O. KOPAS.

Witnesses:
SOLON C. KEMON,
CHAS. A. PETTIT.